(12) United States Patent
Kulbeth (10) Patent No.: US 11,224,831 B1
(45) Date of Patent: Jan. 18, 2022

(54) RETRACTABLE SHAKER DAM ASSEMBLY AND METHOD

(71) Applicant: DEL Corporation, Lafayette, LA (US)

(72) Inventor: Robert M. Kulbeth, Church Point, LA (US)

(73) Assignee: DEL Corporation, Lafayette, LA (US)

( * ) Notice: Subject to any disclaimer, the term of this patent is extended or adjusted under 35 U.S.C. 154(b) by 127 days.

(21) Appl. No.: 16/290,350

(22) Filed: Mar. 1, 2019

(51) Int. Cl.
*B01D 33/76* (2006.01)
*B01D 33/01* (2006.01)

(52) U.S. Cl.
CPC ......... *B01D 33/76* (2013.01); *B01D 33/0183* (2013.01)

(58) Field of Classification Search
None
See application file for complete search history.

(56) References Cited

U.S. PATENT DOCUMENTS

| | | | | |
|---|---|---|---|---|
| 2,161,500 A * | 6/1939 | Bird | ........................ | B03B 4/02 209/466 |
| 2,462,878 A * | 3/1949 | Logue | ................... | B01D 35/28 210/389 |
| 3,206,396 A * | 9/1965 | Davis | ...................... | B29B 13/06 210/780 |
| 3,426,908 A * | 2/1969 | Davis | ..................... | B01D 33/72 210/401 |
| 3,731,808 A * | 5/1973 | Rickert | ................ | B01D 29/603 210/138 |
| 3,929,642 A * | 12/1975 | Ennis | ..................... | B01D 35/28 210/113 |
| 3,943,233 A * | 3/1976 | Swanson | ................ | B01D 33/04 423/332 |
| 3,970,552 A * | 7/1976 | Bongert | ............. | B01D 33/0346 210/780 |
| 4,038,193 A * | 7/1977 | Oosten | ................... | B01D 33/04 210/400 |
| 4,139,465 A * | 2/1979 | Nordengren | ........... | B01D 25/28 210/772 |
| 4,192,743 A * | 3/1980 | Bastgen | ................. | B01D 33/04 210/712 |
| 4,233,157 A * | 11/1980 | Miller | .................... | B01D 29/19 210/137 |
| 4,267,060 A * | 5/1981 | Miller | .................... | B01D 29/96 210/741 |
| 4,285,816 A * | 8/1981 | Lee | ......................... | B01D 33/82 210/401 |
| 4,306,974 A * | 12/1981 | Harry | .................... | B01D 35/28 210/388 |
| 4,350,591 A * | 9/1982 | Lee | ........................ | B01D 35/30 210/384 |

(Continued)

OTHER PUBLICATIONS

Applicant's copending U.S. Appl. No. 16/131,900, filed Sep. 14, 2018.

(Continued)

*Primary Examiner* — Robert J Popovics
(74) *Attorney, Agent, or Firm* — Jones Walker LLP (57) ABSTRACT

A dam assembly is provided which is used to increase retention time on the shaker and therefore achieve maximum dryness of solids, such as cuttings, sand, dirt, and other particles. As solids are conveyed to the end of the shaker, the solids will begin to pile up behind the dam assembly. Once enough solids of sufficient weight pile up behind the dam assembly, the dam assembly will fold over and release the solids.

6 Claims, 5 Drawing Sheets

(56) References Cited

U.S. PATENT DOCUMENTS

| | | | | |
|---|---|---|---|---|
| 4,446,022 A * | 5/1984 | Harry | B01D 35/28 | 210/388 |
| 4,459,207 A * | 7/1984 | Young | B01D 35/20 | 209/269 |
| 4,495,065 A * | 1/1985 | DeReamer | B01D 35/28 | 209/243 |
| 4,634,535 A * | 1/1987 | Lott | B01D 21/00 | 210/780 |
| 4,824,581 A * | 4/1989 | Cooper | B01D 33/042 | 210/709 |
| 4,895,653 A * | 1/1990 | Cherochak | B01D 33/04 | 210/400 |
| 5,308,487 A * | 5/1994 | Thissen | B01D 33/747 | 210/400 |
| 5,392,925 A * | 2/1995 | Seyffert | B07B 1/46 | 209/403 |
| 5,501,343 A * | 3/1996 | Hadden | B07B 1/46 | 209/240 |
| 5,527,458 A * | 6/1996 | Gehrmann | B01D 33/04 | 210/177 |
| 5,571,404 A * | 11/1996 | Derenthal | B01D 33/04 | 210/97 |
| 5,840,187 A * | 11/1998 | Derenthal | F26B 17/04 | 210/400 |
| 5,862,612 A * | 1/1999 | Bielfeldt | B30B 9/105 | 34/398 |
| 6,079,568 A * | 6/2000 | Loshe | B01D 33/0353 | 209/311 |
| 6,155,428 A * | 12/2000 | Bailey | B01D 33/763 | 209/315 |
| 6,352,159 B1 * | 3/2002 | Loshe | B01D 33/0353 | 209/268 |
| 6,412,644 B1 * | 7/2002 | Crabbe | B01D 33/033 | 209/309 |
| 6,506,310 B2 * | 1/2003 | Kulbeth | B01D 21/0018 | 175/206 |
| 6,530,482 B1 * | 3/2003 | Wiseman | B01D 33/0346 | 209/253 |
| 6,622,870 B1 * | 9/2003 | Prinssen | B01D 33/04 | 210/398 |
| 6,715,611 B2 * | 4/2004 | Crabbe | B01D 33/033 | 209/309 |
| 6,808,626 B2 | 10/2004 | Kulbeth | | |
| 6,863,183 B2 * | 3/2005 | Schulte | B01D 33/033 | 209/405 |
| 6,868,972 B2 * | 3/2005 | Seyffert | B01D 33/0376 | 209/254 |
| 6,976,819 B2 | 12/2005 | Kulbeth | | |
| 6,988,624 B2 * | 1/2006 | MacNaughton | B07B 1/005 | 209/315 |
| 7,029,579 B2 * | 4/2006 | Tapp | B01D 29/09 | 210/193 |
| 7,198,156 B2 * | 4/2007 | Schulte | B01D 33/033 | 209/309 |
| 7,216,767 B2 * | 5/2007 | Schulte | B01D 33/033 | 209/309 |
| 7,278,540 B2 * | 10/2007 | Stone | B01D 33/0376 | 209/309 |
| 7,306,057 B2 * | 12/2007 | Strong | B01D 17/0211 | 175/66 |
| 7,509,759 B2 * | 3/2009 | Langdon | B01D 21/0015 | 37/307 |
| 7,514,011 B2 * | 4/2009 | Kulbeth | B01D 21/267 | 210/780 |
| 7,584,858 B2 * | 9/2009 | Barrett | B07B 1/4609 | 209/405 |
| 7,703,612 B2 * | 4/2010 | Browne | B07B 1/46 | 209/311 |
| 7,757,864 B2 * | 7/2010 | Barrett | B07B 1/485 | 209/274 |
| 7,896,162 B2 * | 3/2011 | Bailey | B07B 1/46 | 209/254 |
| 8,113,356 B2 * | 2/2012 | Burnett | B07B 1/46 | 209/315 |
| 8,147,689 B1 * | 4/2012 | Cogar | B01D 33/327 | 210/173 |
| 8,418,856 B2 * | 4/2013 | Bailey | B01D 33/37 | 209/268 |
| 8,449,779 B2 | 5/2013 | Thompson | | |
| 8,453,844 B2 * | 6/2013 | Bailey | E21B 21/065 | 209/317 |
| 8,517,167 B2 | 8/2013 | Thompson | | |
| 8,556,083 B2 * | 10/2013 | Burnett | B07B 13/16 | 209/315 |
| 8,561,805 B2 * | 10/2013 | Scott | B01D 33/722 | 209/555 |
| 8,695,805 B2 * | 4/2014 | Dufilho | B07B 13/16 | 209/403 |
| 8,807,343 B2 * | 8/2014 | Bailey | B07B 13/16 | 209/17 |
| 8,808,354 B2 | 8/2014 | Caro et al. | | |
| 8,857,623 B2 * | 10/2014 | Wiseman | B07B 1/48 | 209/403 |
| 8,869,986 B2 * | 10/2014 | Bailey | B07B 1/4609 | 209/10 |
| 8,881,912 B2 * | 11/2014 | Carr | B07B 1/4663 | 209/413 |
| 9,079,222 B2 * | 7/2015 | Burnett | B01D 33/0376 | |
| 9,498,739 B2 | 11/2016 | Thompson | | |
| 9,597,614 B2 | 3/2017 | Thompson | | |
| 9,677,353 B2 * | 6/2017 | Burnett | B07B 1/28 | |
| 9,687,761 B2 | 6/2017 | Thompson | | |
| 9,752,399 B2 * | 9/2017 | Timmerman | B07B 13/16 | |
| 10,017,097 B2 * | 7/2018 | Ozinga | B60P 3/16 | |
| 10,047,577 B2 * | 8/2018 | Bailey | B07B 1/28 | |
| 10,711,545 B2 * | 7/2020 | Babri | E21B 21/066 | |
| 10,737,202 B2 * | 8/2020 | Sharpe | E21B 21/065 | |
| 10,751,654 B1 * | 8/2020 | Kulbeth | B01D 21/0045 | |
| 10,773,188 B1 * | 9/2020 | Kulbeth | B01D 21/2461 | |
| 10,857,488 B1 * | 12/2020 | Kulbeth | B01D 21/0006 | |
| 10,907,338 B1 * | 2/2021 | Happel | B01D 29/56 | |
| 11,040,300 B1 * | 6/2021 | Kulbeth | B01D 33/0346 | |
| 11,111,743 B2 * | 9/2021 | Ross | B01D 33/41 | |
| 2004/0134863 A1 * | 7/2004 | Tapp | B01D 29/82 | 210/783 |
| 2004/0206709 A1 * | 10/2004 | Buisman | B01D 33/042 | 210/783 |
| 2006/0011520 A1 * | 1/2006 | Schulte | B07B 1/4663 | 209/309 |
| 2006/0243643 A1 * | 11/2006 | Scott | B07B 1/4663 | 209/309 |
| 2007/0108106 A1 * | 5/2007 | Burnett | E21B 21/065 | 209/325 |
| 2007/0131592 A1 * | 6/2007 | Browne | E21B 21/065 | 209/399 |
| 2010/0270216 A1 * | 10/2010 | Burnett | B07B 1/46 | 209/606 |
| 2010/0282648 A1 * | 11/2010 | Bailey | B01D 33/37 | 209/240 |
| 2012/0273398 A1 * | 11/2012 | Wiseman | B07B 1/48 | 209/405 |
| 2016/0177644 A1 * | 6/2016 | Tooley | B01D 21/0015 | 210/359 |
| 2016/0319616 A1 * | 11/2016 | Babri | E21B 21/066 | |
| 2017/0087487 A1 * | 3/2017 | Sharpe | B07B 13/16 | |
| 2017/0254163 A1 * | 9/2017 | Ross | B01D 33/76 | |

OTHER PUBLICATIONS

Applicant's copending U.S. Appl. No. 16/229,324, filed Dec. 21, 2018.

Applicant's copending U.S. Appl. No. 16/393,718, filed Apr. 24, 2019.

Applicant's copending U.S. Appl. No. 16/529,513, filed Aug. 1, 2019.

* cited by examiner

RETRACTABLE SHAKER DAM ASSEMBLY AND METHOD

BACKGROUND OF THE DISCLOSURE

The disclosure relates to a dam assembly for a shaker used to increase the dryness of solids when separating the solids from a slurry.

SUMMARY OF THE DISCLOSURE

The dam assembly of the present disclosure is used to increase retention time on the shaker and therefore achieve increased dryness of solids, such as cuttings, sand, dirt, and other particles. As solids are conveyed to the end of the shaker, the solids will begin to pile up behind the dam assembly. Once enough solids of sufficient weight pile up behind the dam assembly, the dam assembly will fold over and release the solids, such as down a shaker slide and into a receptacle or cuttings box.

In some cases, the tension on the dam assembly can be increased by adding one or more bungee straps or other extendable assemblies. Hooking a bungee strap in a hole located at the top or top center of the dam and to a pipe running across the shaker connecting two jacks or support beams may increase the amount of weight required for the dam assembly to open and release the built-up solids thereby increasing the retention time of the solids to achieve drier solids.

In some cases, increasing the incline of the shaker deck may increase the amount of solids required to open and fold the dam assembly over to allow the solids to discharge.

The shaker may include a dam assembly comprising a top portion, a bottom portion, and a hinge assembly coupled between the top and bottom portions of the dam assembly, the dam assembly being positioned at a front of a shaker near a first shaker deck, the bottom portion being substantially vertical and fixedly attached at a front of the shaker to a lower portion of the shaker, the top portion being fixed at a bottom first end at a connection point at the hinge assembly and being movable about the connection point at the hinge assembly such that a top second end of the top portion is configured to move about the hinge assembly, the dam assembly being coupled to a first end of the first shaker deck such that a first lateral side of the top portion of the dam assembly faces inward toward the first shaker deck and a second lateral side of the dam assembly faces outward away from the first shaker deck; wherein in a non-extended configuration, the top portion of the dam assembly extends upward from the hinge assembly and the lower portion of the dam assembly, wherein in an extended configuration, the dam assembly bends at the hinge assembly such that the top portion of the dam assembly extends outward at an angle relative to a horizontal axis substantially aligned with a surface supporting the shaker and away from the first shaker deck and the bottom portion of the dam assembly remains substantially vertical relative to the surface supporting the shaker.

In one or more embodiments, the shaker further comprises a crank assembly connected to side support bars of the shaker at upper points on each of the side support bars, wherein the crank assembly includes a first elongated bar portion extended horizontally between first sides of the side support bars of the shaker; and one or more elastic cords attached to the first elongated bar portion via first attachment means and to the top of the top portion of the dam assembly via second attachment means, wherein the hinge assembly and the one or more elastic cords are configured to retain the dam assembly in the non-extended configuration until an applied first force greater than a first threshold amount is exerted on a first lateral side of the top portion of the dam assembly by first dewatered solids, wherein after the applied first force is exerted on the first lateral side of the top portion of the dam assembly, the one or more elastic cords and the hinge assembly operate to move the dam assembly into the extended configuration, and wherein the one or more elastic cords and the hinge assembly are configured to return the dam assembly to the non-extended configuration from the extend position responsive to a decrease in the applied first force.

In one or more embodiments, in a tightened state, the extendable support means comprises a first number of elastic cords, such that the first threshold amount is increased, in a loosened state, the extendable support means comprises a second number of one or more elastic cords, such that the first threshold amount is decreased, and the first number of elastic cords is greater than the second number of one or more elastic cords.

In one or more embodiments, the first threshold amount is a function of tension of the one or more elastic cords, wherein increasing the tension of the one or more elastic cords corresponds to an increased first threshold amount, and wherein decreasing the tension of the one or more elastic cords corresponds a decreased first threshold amount In one or more embodiments, the crank assembly comprises a second bar portion configured to manually operate the one or more elastic cords to operate the top portion of the dam assembly.

In one or more embodiments, a first portion of the first dewatered solids overflows the top second end of the top portion of the dam assembly when the dam assembly is in the extended configuration.

In one or more embodiments, the hinge assembly is a spring hinge assembly, and the one or more elastic cords and the spring hinge assembly together comprise a first equilibrium force point in the non-extended configuration that allows the one or more elastic cords and the spring hinge assembly to maintain the dam assembly in the non-extended configuration up to the first equilibrium force point associated with an applied first maximum equilibrium force, and wherein responsive to the applied first force exceeding the applied first maximum equilibrium force, the one or more elastic cords and the spring hinge assembly operate to bend the dam assembly from the non-extended configuration to the extended configuration.

In one or more embodiments, when the dam assembly is in the extended configuration, the one or more elastic cords and the spring hinge assembly together comprise a second equilibrium force point that allows the one or more elastic cords and the spring hinge assembly to maintain the dam assembly in the extended configuration up to the second equilibrium force point associated with an applied second minimum equilibrium force, and wherein responsive to an applied second force of less than the second minimum equilibrium force on the first lateral side of the top portion of the dam assembly by at least a portion of the first dewatered solids, the one or more elastic cords and the spring hinge assembly operate to retract the dam assembly from the extended configuration to the non-extended configuration.

In one or more embodiments, a first amount of dewatered solids provides the applied first force in the non-extended configuration, and a second amount of dewatered solids provides the applied second force in the extended configuration.

In one or more embodiments, the first amount of dewatered solids providing the applied first force is greater than the second amount of dewatered solids providing the applied second force.

In one or more embodiments, the hinge assembly is configured to retain the dam assembly in the non-extended configuration until an applied first force greater than a first threshold amount is exerted on a first lateral side of the top portion of the dam assembly by first dewatered solids, wherein after the applied first force is exerted on the first lateral side of the top portion of the dam assembly, the hinge assembly operates to move the dam assembly into the extended configuration, and wherein the hinge assembly is configured to return the dam assembly to the non-extended configuration from the extend position responsive to a decrease in the applied first force.

In one or more embodiments, a first portion of the first dewatered solids overflows the top second end of the top portion of the dam assembly when the dam assembly is in the extended configuration.

In one or more embodiments, the hinge assembly is a spring hinge assembly that comprises a first equilibrium force point in the non-extended configuration that allows the spring hinge assembly to maintain the dam assembly in the non-extended configuration up to the first equilibrium force point associated with an applied first maximum equilibrium force, and wherein responsive to the applied first force exceeding the applied first maximum equilibrium force, the spring hinge assembly operates to bend the dam assembly from the non-extended configuration to the extended configuration.

In one or more embodiments, when the dam assembly is in the extended configuration, the spring hinge assembly comprises a second equilibrium force point that allows the spring hinge assembly to maintain the dam assembly in the extended configuration up to the second equilibrium force point associated with an applied second minimum equilibrium force, and wherein responsive to an applied second force of less than the second minimum equilibrium force on the first lateral side of the top portion of the dam assembly by at least a portion of the first dewatered solids, the spring hinge assembly operates to retract the dam assembly from the extended configuration to the non-extended configuration.

In one or more embodiments, the hinge assembly is adjustable such that in a tightened state, the first equilibrium force point is associated with an increased applied first maximum equilibrium force, and in a loosened state, the first equilibrium force point is associated with a decreased applied first maximum equilibrium force.

In one or more embodiments, the hinge assembly is adjustable such that in a first tightened state, the first equilibrium force point is associated with an increased applied first maximum equilibrium force, in a second tightened state, the second equilibrium force point is associated with an increased applied second minimum equilibrium force, in a third tightened state, the first equilibrium force point is associated with an increased applied first maximum equilibrium force and the second equilibrium force point is associated with an increased applied second minimum equilibrium force, in a first loosened state, the first equilibrium force point is associated with a decreased applied first maximum equilibrium force, in a second loosened state, the second equilibrium force point is associated with a decreased applied second minimum equilibrium force, and in a third loosened state, the first equilibrium force point is associated with a decreased applied first maximum equilibrium force and the first equilibrium force point is associated with a decreased applied first maximum equilibrium force.

In one or more embodiments, the first equilibrium force point is greater than the second equilibrium force point such that a greater force is needed to be applied on the first lateral side of the top portion of the dam assembly to begin moving the dam assembly from the non-extended configuration to the extended configuration than is needed to be applied on the first lateral side of the stop portion of the dam assembly to begin retracting the dam assembly from the extended configuration to the non-extended configuration.

In one or more embodiments, a first amount of dewatered solids provides the applied first force in the non-extended configuration, and a second amount of dewatered solids provides the applied second force in the extended configuration.

In one or more embodiments, the first amount of dewatered solids providing the applied first force is greater than the second amount of dewatered solids providing the applied second force.

In one or more embodiments, the first equilibrium force point associated with the applied first maximum equilibrium force is a function of a thickness of the hinge assembly, wherein increasing the thickness corresponds to the first equilibrium force point being associated with an increased applied first maximum equilibrium force, and wherein decreasing the thickness corresponds to the first equilibrium force point being associated with a decreased applied first maximum equilibrium force.

In one or more embodiments, the angle relative to the horizontal axis substantially aligned with a surface supporting the shaker is about 80 degrees to about (−90) degrees.

The disclosure also relates to a method for operating a shaker and/or a shaker assembly system as described above. In one or more embodiments, the method may include applying the first force on the first lateral side of the top portion of the dam assembly, the first force provided by dewatered solids the first shaker deck; responsive to the application of the first force, operating the hinge assembly to move the dam assembly into the extended configuration to discharge at least a portion of the dewatered solids from the dam assembly; decreasing the applied first force on the first lateral side of the top portion of the dam assembly; and responsive to the decrease in the applied first force, operating the hinge assembly to move the dam assembly from the extended configuration to the non-extended configuration to prevent the discharge of additional dewatered solids.

In one or more embodiments, the method may include applying the third force on the first lateral side of the top portion of the dam assembly, the third force provided by dewatered solids in the first shaker deck; responsive to the application of the third force, operating the hinge assembly and the extendable support means to move the dam assembly into the extended configuration to discharge at least a portion of the dewatered solids from the dam assembly; decreasing the applied third force on the first lateral side of the top portion of the dam assembly; and responsive to the decrease in the applied third force, operating the hinge assembly and the extendable support means to move the dam assembly from the extended configuration to the non-extended configuration to prevent the discharge of additional dewatered solids.

DETAILED DESCRIPTION OF THE DISCLOSURE

Figure 1:
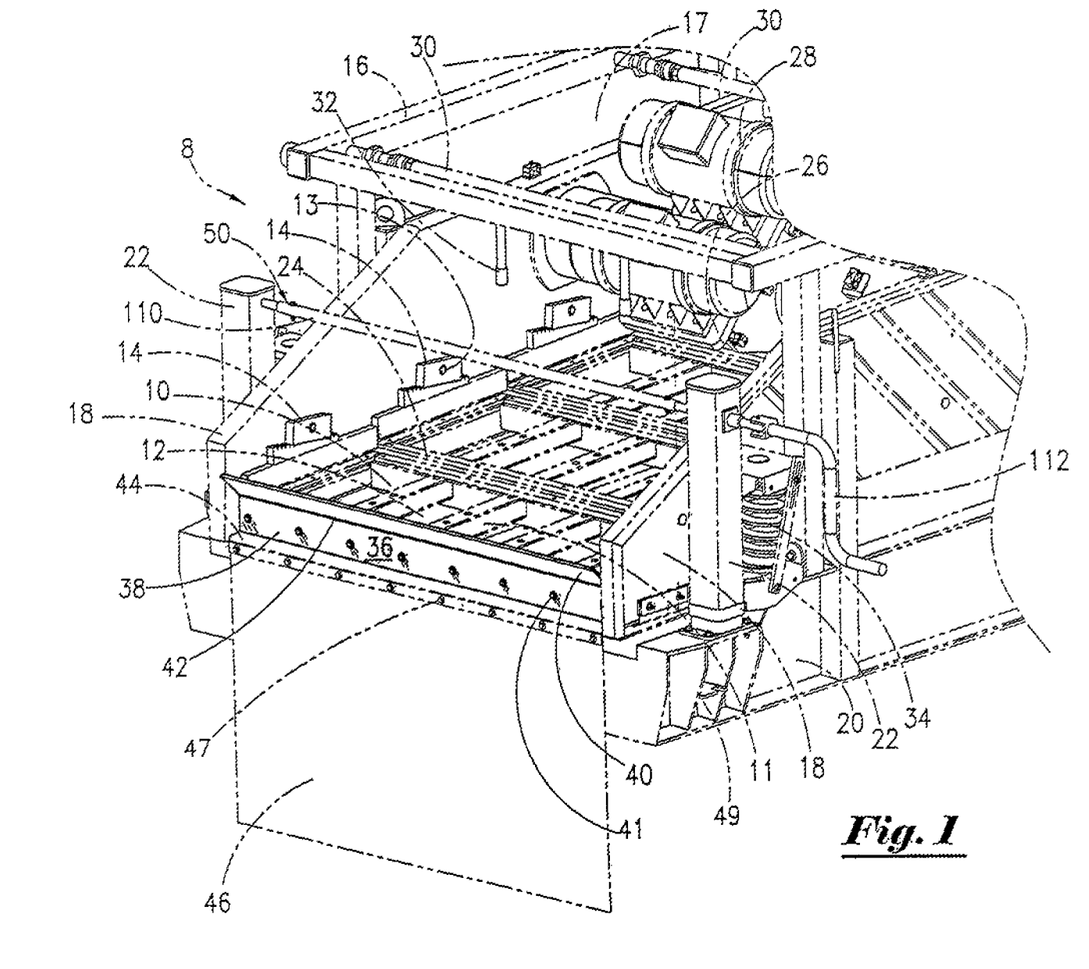
FIG. 1 is a perspective view of an embodiment of a shaker assembly system with a dam assembly.

With reference to the figures where like elements have been given like numerical designation to facilitate an understanding of the present disclosure, and particularly with reference to the embodiment of the shaker assembly system illustrated in FIG. 1, shaker assembly system 8 may include shaker deck 10 (which may comprise a series of shaker decks 10), frame 16, side support bars 22, upper transport assembly 26, and dam assembly 36. Shaker assembly system 8 may be a linear shaker.

Shaker deck 10, may each include vibrating screen media 12 (which may comprise a series of vibrating screen media 12) that function to dewater and dry solids contained in slurry discharged onto screens 12. In some embodiments, the vibrating screen media 12 may include one or more vibrating mesh screens that may be made of metal, such as stainless steel. In some embodiments, the vibrating screen media 12 may include one or more polyurethane slotted screens. Screens 12 may be located in a lower portion of a corresponding shaker deck 10. Each deck 10 may include a rack assembly 11 positioned in an upper portion of the shaker deck 10 to provide support for the shaker deck 10. Vibration of the screens 12 may be actuated via a vibration facilitator 34 which may include a spring device and may be coupled to a motor or agitator in some embodiments to facilitate the vibration.

The shaker screens 12 may include one or more screens that are sized to permit fluid to drain below the screen or screens 12 (the underflow) and solids to remain on the screen or screens 12 where the solids dry and are conveyed across the screen or screens, such as via the vibration facilitator 34. The screens 12 may be of different sizes and dimensions relative to other screens 12. For example, the screens may be between about 50-200 mesh to about ½ inch screens. The dimensions of each successive screen grate may get smaller and smaller. The screens 12 may be, for example, SST wire mesh (stainless steel) or polyurethane panels. Three shaker decks 10 are shown, but there may be fewer (one or two) or more than three. In some embodiments, the decks 10 may be separated by screen separation bars 24. In some embodiments, each of the decks 10 (or screens 12) may be of varying elevation to other decks 10 (or screens 12).

Outer portions of the shaker decks 10 may include side guard walls 14, which may extend upward away from the screens 12. The side guard walls 14 may have a stair-step shape, as shown in FIG. 1. The upper portion of the side guard walls 14 may be coupled to side walls 18 by bolts 13. As shown, the two side walls 18 may extend upward beyond the side guard walls 18. Side walls 18 may have a sloping shape from a higher rear portion near rearward positioned shaker deck 10 to a lower front portion that may terminate at or beyond the end of the forward shaker deck 10.

In some embodiments, side walls 18 may be coupled to elongated side support bars 22. In some embodiments, side walls 18 may be coupled to elongated side support bars 22 via platform 49 connected to bottom portion 20. Support bars 22 may be connected to and sit on top of platform 49. Support bars 22 may be positioned on an opposite side of side wall 18 from the shaker deck 10 at the front of the shaker assembly system 8. Side support bars 22 may be positioned near shaker deck 10 and may extend up away from the shaker deck 10. Side walls 18 and side support bars 22 may be attached to a bottom portion 20 of the shaker assembly 8. The bottom portion 20 may extend from near the front edge of forward shaker deck 10 back to near or past the rear of rearward shaker deck 10.

Side walls 18 may be coupled to a frame assembly 16 toward the higher portion of each side wall 18. Frame assembly 16 may be connected to the bottom portion 20 of the shaker assembly 8. Frame assembly 16 may have a top portion positioned above the two side walls 18 and include an opening 17 in the middle of the top portion of the frame assembly 16. The frame assembly 16 may include a lower portion extended about and around one or more of the shaker decks 10 and connecting to the bottom portion 20.

An upper transport assembly 26 may be positioned at least partially within and through the opening 17 of the frame assembly 16. Upper transport assembly 26 may transport and deposit slurry (solids and fluid mixture) toward and onto decks 10 and screens 12. In some embodiments, upper transport assembly 26 may be a slide device 26 angled down toward the screen media, where the slurry slides down the slide device 26 from a top to a bottom of the slide device 26. In some embodiments, upper transport assembly 26 may be a conduit or pipe. In some embodiments, the upper transport assembly 26 may receive slurry from one or more hydrocyclone units, bar screen device, other types of slurry processing assemblies or a tank. For example, the upper transport assembly 26 may receive the underflow of one or more hydrocyclones. In some embodiments, the shaker assembly 8 may include a roller device 28 positioned at least partially within and through the opening 17 of the frame assembly 16 that may facilitate moving slurry down the upper transport assembly 26. In some embodiments, these other types of slurry processing assemblies and components disclosed herein may include one or more components in U.S. patent application Ser. No. 16/227,417 (entitled, "FLOW BACK SEPARATION SYSTEM AND METHOD"), filed Dec. 20, 2018; U.S. patent application Ser. No. 16/229,324 (entitled, "AIR DRILLING SOLIDS CONTROL SYSTEM AND METHOD"), filed Dec. 21, 2018; and U.S. patent application Ser. No. 16/131,900 (entitled, "SYSTEM FOR SEPARATING SOLIDS FROM A FLUID STREAM"), filed Sep. 14, 2018, each of which is herein incorporated by reference in their entirety for any and all purposes.

The slurry deposited by the upper transport assembly may pass through rack assembly 11 of the decks 10 before making it down to the screens 12. In some embodiments, vibration of screens 12 by vibration facilitators 34 may move the deposited slurry across the screens toward a discharge end past forward shaker deck 10. Vibration facilitators 34 may be attached to side walls 18 adjacent to and behind side support bars 22. In some embodiments, vibration facilitator 34 may be coupled to a motor or an agitator to provide vibration. In some embodiments, vibration facilitator 34 may include a spring that may compress and extend while vibrating.

In some embodiments, decks 10 and screens 12 may be angled down toward the rear of assembly away from the lower portion of side walls 18 to increase the dryness of the solids by increasing the retention time the solids are within the decks 10. In some embodiments, the angle of the decks may be increased to increase the dryness of the solids. For example, the incline of the decks 10 may be adjusted depending on desired dryness and conveyance of solids/material.

Spray bars 30 may be attached to the upper portion of the frame 16 at ends of the spray bars 30, as shown in FIG. 1. Spray bars 30 may be conduits that may connect to fluid lines that provide fluid to the spray bars 30. Spray bars 30 may spray or otherwise provide fluid down toward the decks 10 that washes any solid (e.g., sand) buildup in the decks 10 (e.g., such as on screens 12), with the excess fluid under flow from the decks 10 and screens 12 falling through the screens 12 into the bottom portion 20 into a compartment 52 (FIGS. 4a, 4b, 5a, 5b). The excess fluid and any fine particles that pass through the screens 12 may flow to a tank or some other processing assembly. For example, excess fluid and any fine particles that pass through the screens 12 may fall down to a lower transport assembly 54 (e.g., a slide) (FIGS. 4a, 4b, 5a, 5b), which may be angled away from the front of the assembly 8. In some embodiments, one or more of the spray bars 30 may include one or more nozzles 32 that extend downward toward the decks 10 to provide the fluid.

Shaker assembly 8 may include dam assembly 36. In some embodiments, dam assembly 36 may be a flexible dam on the discharge end of shaker assembly 8 to enhance the dewatering of the solids moving through and/or on decks 10. In some embodiments, once enough weight builds up behind the dam 36, the dam 36 may fold over and release the solids/material such as down guide 46. This is discussed further herein.

Guide 46 may be an elongated shaker slide. A top portion of the guide 46 may be attached by screws 47 to a shoulder 44 (or lateral wall 44) extending out from and coupled to a bottom end 102 of the lower portion 38 of the dam assembly 36. The guide 46 may extend downward away from the dam assembly 36 and may operate by conveying dewatered solids that pass via the dam assembly 36 away from the shaker assembly 8, such as to a catch box, container, or conveyor.

Figure 5A:
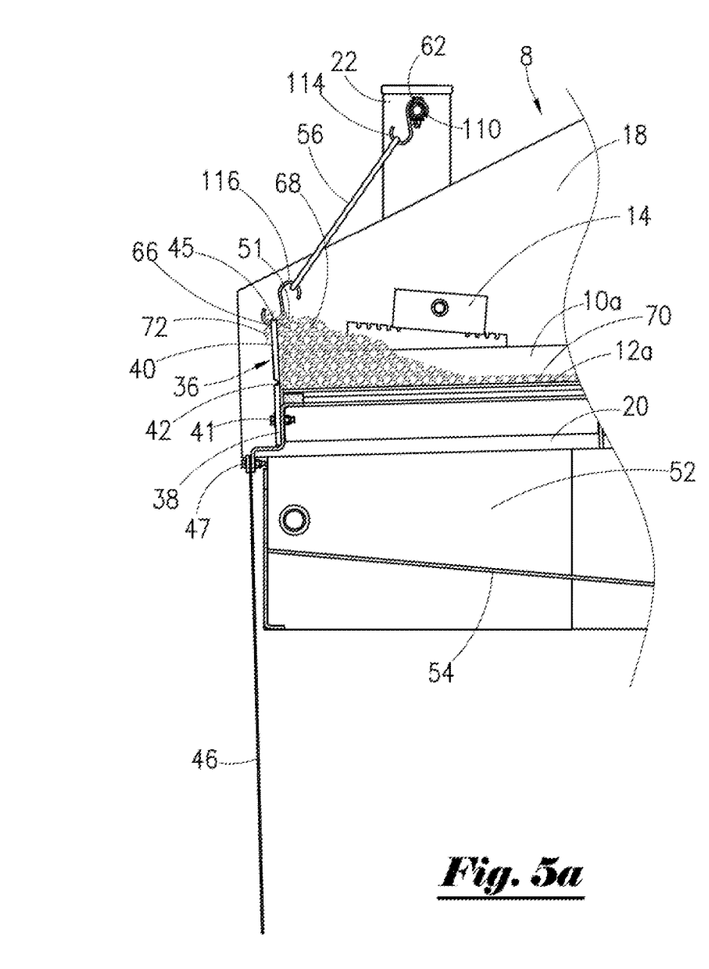
FIG. 5a is a cross sectional view of an embodiment of a shaker assembly system with a dam assembly and an extendable support assembly in a non-extended configuration.
Figure 5B:
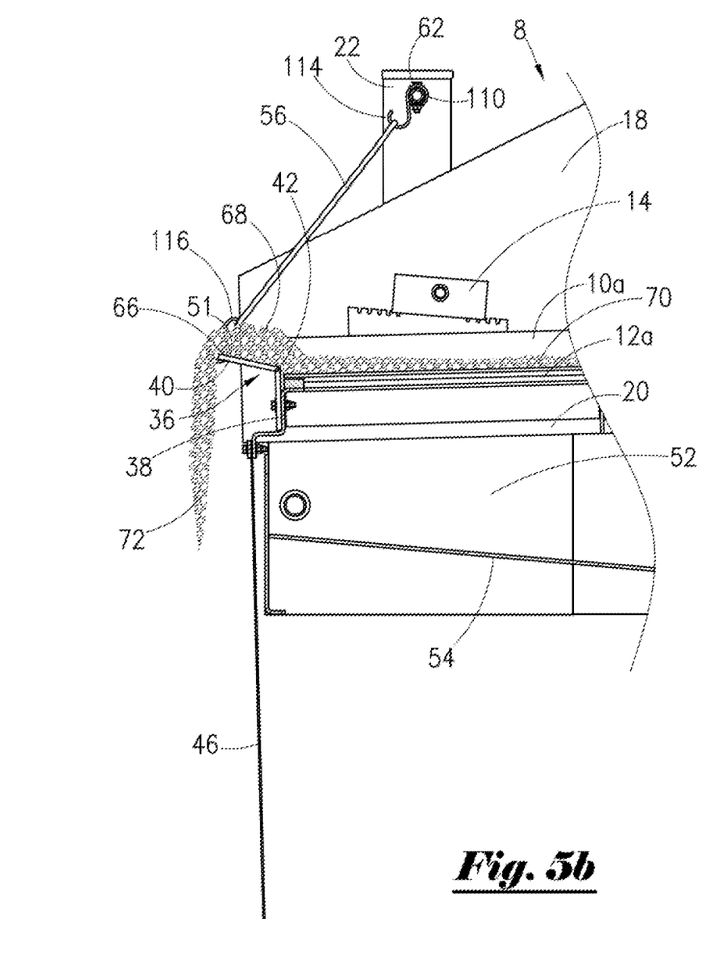
FIG. 5b is a cross sectional view an embodiment of a shaker assembly system with a dam assembly and an extendable support assembly in an extended configuration.

Shaker assembly 8 may include a crank assembly 50, which may include a first elongated bar portion 110 extending horizontally between and connected to upper points of first interior sides of side support bars 22. In some embodiments, crank assembly 50 may be lockable such that it might not rotate. In some embodiments, crank assembly 50 may rotate about an axis. The crank assembly 50 may include a second bar portion 112 extending from a second exterior side of at least one of the side support bars 22. Second bar portion 112 may be bent and/or curved. In some embodiments, and as discussed more below, the crank assembly 50 may support extendable support assembly 56 (FIGS. 5a and 5b).

Figure 2:
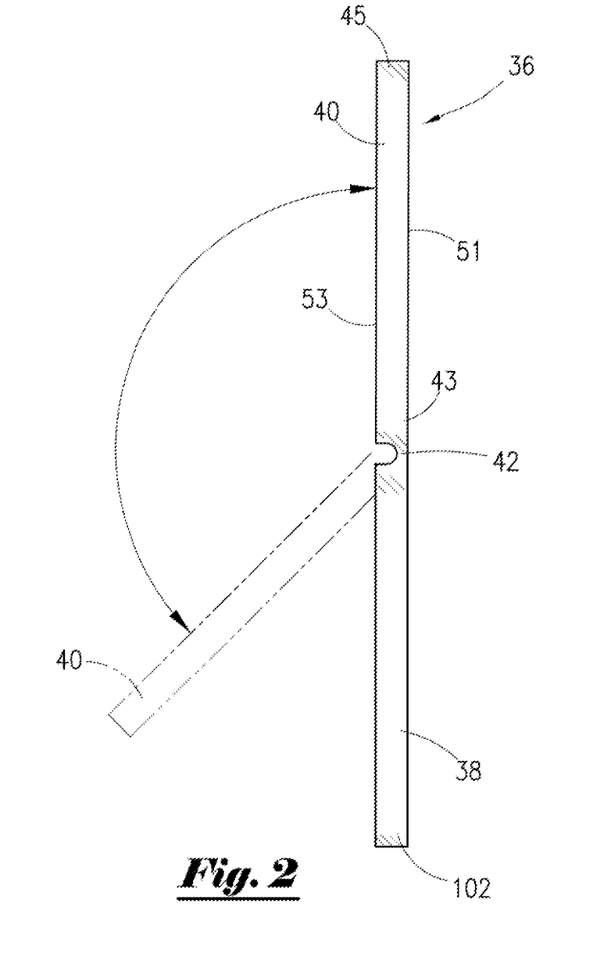
FIG. 2 is a side view of an embodiment of a dam assembly.
Figure 3:
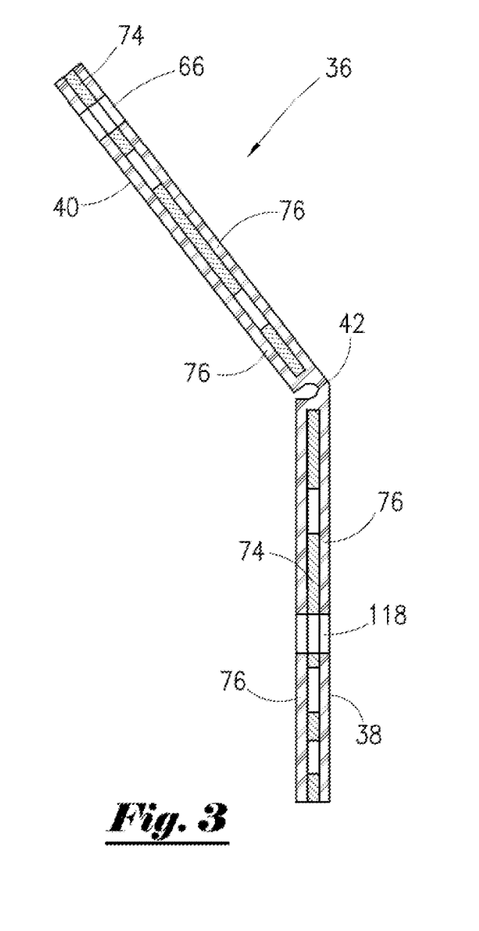
FIG. 3 is a cross-sectional view of an embodiment of the dam assembly taken along line 3-3 of FIG. 6.

As shown in FIGS. 1-3, the dam assembly 36 may include a bottom portion 38, a top portion 40, and a hinge assembly 42 coupled to and between the bottom and top portions 38, 40. The dam assembly 36 may have an interior 74 and exterior 76. The dam assembly 36 may be positioned at the front of the shaker assembly 8 near forward shaker deck 10. In some embodiments, top portion 40 may be about 4 feet to 6 feet long, about ⅛ inch to 2 inch in thickness, and about 3 inches to 12 inches in height. For example, the top portion 40 may be about 5 feet long, about ⅜ inches in thickness, and about 4'A inches in height. The bottom portion 38 may be substantially vertically positioned and fixedly attached at the front of the shaker assembly to side walls 18 and to the bottom portion 20 of the assembly 8 such as via bolts 41. In some embodiments, bottom portion 38 may be about 4 feet to 6 feet long, about ⅛ inch to 2 inch in thickness, and about 3 inches to 12 inches in height. For example, the bottom portion 38 may be about 5 feet long, about ⅜ inches in thickness, and about 4⅝ inches in height. In one exemplary embodiment, the hinge can be about 3/16 inches thick, but may be about ⅛ inches thick to about 1.5 inches thick. These dimensions can be varied such as by decrease or increase. For example, the height of the top portion 40 may be increased to hold more solids or to increase the retention time of the solids in the decks 10 to increase drying/dewatering time of the solids before discharge. In another example, the thickness of the hinge 42 may be increased to increase the tension or strength of the hinge to hold more solids or increase the retention time of the solids in the decks 10.

The top portion 40 may be fixedly attached at a bottom end 43 at a connection point at the hinge assembly 42 such that the top portion 40 may be movable about the connection point at the hinge such that a top end 45 of the top portion 40 may move outward away from the forward shaker deck 10 when in an inward configuration, and likewise, the top portion 40 may move inward toward the forward shaker deck 10 when in an extended configuration. The dam assembly 36 may be coupled to the front end of the forward shaker deck 10 such that a first lateral side 51 of the top portion 40 of the dam assembly 36 may face inward toward the decks 10. A second lateral side 53 of the top portion 40 may face outward away from the decks 10. Varying the height of the dam 36 can allow for more solids to build up behind the dam 36 before the dam 36 releases the solids.

After enough solids build up behind the dam 36, the top portion 40 may swing out away from forward shaker deck 10 allowing the solids to overflow and discharge from deck 10. For example, when the dam 36 is in a non-extended configuration, the top portion 40 of the dam 36 extends upward from the hinge assembly 42 and the bottom portion 38 of the dam 36, such that the top portion 40 and the bottom portion 38 form a substantially straight up and down assembly (e.g., an angle of about 180 degree, top portion 40 having an angle of about 90 degrees relative to the ground or surface supporting the shaker assembly 8). In some embodiments, the angle the top portion 40 forms relative to the ground or surface supporting the shaker assembly 8 may range from about 70 degrees to about 110 degrees when the dam is in the non-extended configuration (e.g., an angle between the top and bottom portions 40, 38 may be about 160 degrees to 200 degrees), such as slightly bending at the hinge assembly 42.

Figure 4A:
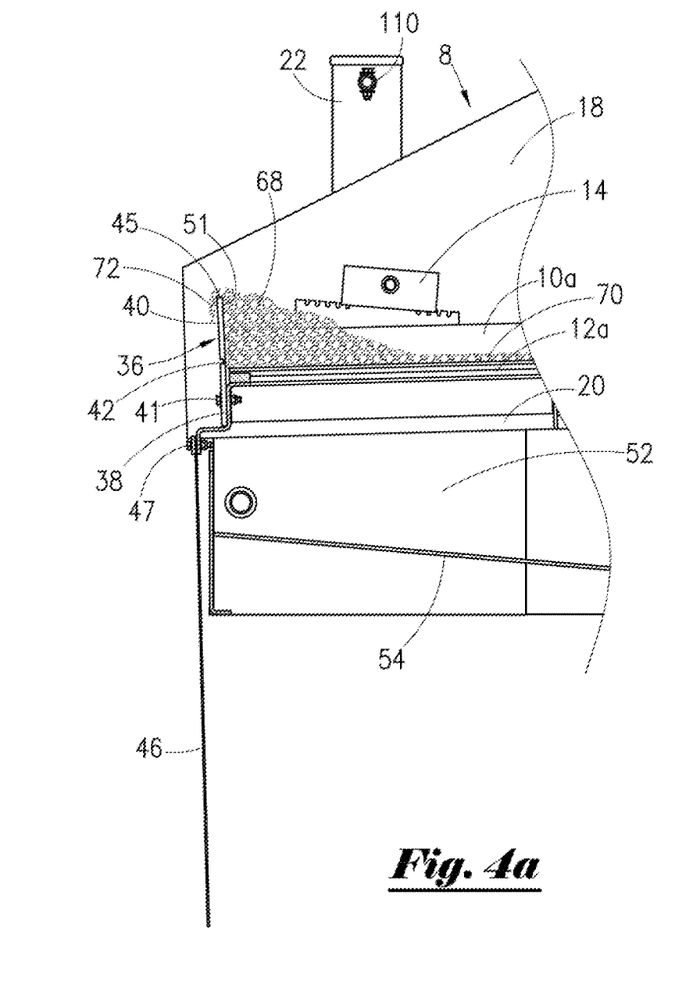
FIG. 4a is a cross sectional view of an embodiment of a shaker assembly system with a dam assembly in a non-extended configuration.

As shown in FIGS. 2 and 4a, in the non-extended configuration, the dam 36 acts to block solids 68 from being released from the front discharge end of the shaker assembly 8, so that most of or substantially all of the solids in the decks 10 remain in the decks 10. In some embodiments, solids might not be overflowing the top of the dam 36 before the top portion 40 is released and extended outward. In some embodiments, a substantially small portion or smidgen of solids may slightly overflow the top of the dam before the top portion 40 is released and extended outward.

Figure 4B:
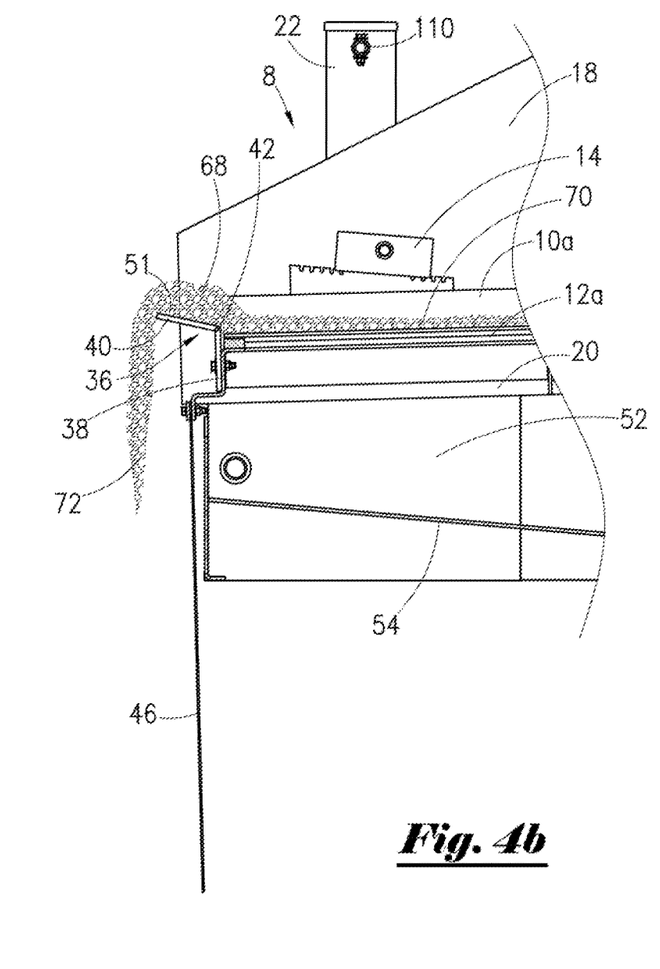
FIG. 4b is a cross sectional view of an embodiment of a shaker assembly system with a dam assembly in an extended configuration.

As shown in FIGS. 2, 3, and 4b, in an extended configuration, the dam 36 may bend at the hinge assembly 42 such that the top portion of the dam 36 extends outward at an angle relative to the bottom portion 38 or the ground (surface supporting the shaker assembly 8) and away from the shaker decks 10 while the bottom portion 40 of the dam 36 remains substantially vertical. In some embodiments, in the extended configuration, the angle the top portion 40 forms relative to the ground (surface supporting the shaker assembly 8) may range from about 80 degrees to about (−90) degrees (e.g., an angle between the top and bottom portions 40, 38 may be about 170 degrees to about 0 degrees). FIG. 2 illustrates an example movement of the top portion 40 through the range of motion or range of angles between the non-extended configuration and the extended configuration. In the extended configuration, the dam 36 acts to release solids overflow 72 from the front discharge end of the shaker assembly 8, so that most of or substantially all of the solids in the decks 10 are released from the decks 10.

In some embodiments, the thickness of the hinge 42 may determine or be a function of how much weight the dam 36 can block before the dam 36 moves from the non-extended configuration to the extended configuration. That is, the thickness of the hinge 42 can determine tension of the hinge 42. For example, once a sufficient amount of weight of solids (sand, dirt, etc.) builds up behind the dam 36, the hinge 42 may operate to open the dam 36 by moving the top portion 40 of the dam 36 from a non-extended configuration to an extended configuration to allow at least a portion of the buildup of solids to discharge via the dam 36. In one exemplary embodiment, the hinge can be about 3/16 inches thick.

In some embodiments, the hinge 42 may retain the dam 36 in the non-extended configuration until an applied force of a first threshold amount provided by dewatered solids is exerted on the lateral side 51 of the top portion 40 of the dam assembly 36. In some embodiments, after this applied force is exerted on the lateral side 51 of the top portion 40 of the dam assembly 36, the hinge 42 operates to move the dam assembly 36 into the extended configuration. The hinge assembly 42 may return the dam assembly 36 to the non-extended configuration from the extend position responsive to a decrease in this applied force, such as after some or substantially all of the dewatered solids are discharged. In some embodiments, the hinge 42 may be adjusted (modify tightness, thickness, and the like) such that the top portion 40 moves outward after the height of built up solids reaches substantially the top of the top portion 40. The dam 36 may be in an extended configuration for a time period based on the amount of dewatered solids that have built up in the decks 10 and released. In some embodiments, the dam 36 may be in an extended configuration for about 1-30 seconds, such as about 15 or 20 seconds. In some embodiments, it can be in an extended configuration for more than 30 seconds.

In some embodiments, the hinge 42 may operate such that the amount of solids 68 pushing against lateral side 51 required to move the dam 36 from the non-extended configuration to the extended configuration compared to a smaller amount of solids 68 may be greater than or substantially greater than the amount of solids laying on top of the lateral side 51 in the extended configuration when the dam moves back from the extended configuration to the non-extended configuration. That is, the top portion 40 may stay extended even though the amount of solids that initially forced the top portion 40 open may be decreasing due to the discharge of the solids overflow 72, such as shown in FIGS. 4a and 4b.

Hinge assembly 42 may be any type of hinge, such as a spring hinge, continuous hinge, latch hinge, butt hinge, and the like. For example, the hinge assembly 42 may be a spring hinge or spring-loaded hinge and be configured such that a first equilibrium force point of the hinge 42 in the non-extended configuration allows the spring hinge 42 to maintain the dam assembly 36 in the non-extended configuration up to the first equilibrium force point associated with an applied first maximum equilibrium force. The applied first maximum equilibrium force is the maximum threshold force that can be applied to the lateral side 51 of the top portion 40 right before moving the dam 36 to the extended configuration from the non-extended configuration and can be supplied by the dewatered solids 68. Any force (i.e., resultant force, distributed forces), such as provided by dewatered solids, less than this applied first maximum equilibrium force allows the dam assembly 36 to remain in the non-extended configuration, which may allow for the buildup of dewatered solids in the decks 10 before the top portion 40 swings out. This allows for a longer retention time of the solids 68 in the decks 10, which allows for more drying of the solids 68 before being discharged.

In some embodiments, the first equilibrium force point of the hinge 42 may be based on the tightness of the hinge 42, the thickness of the hinge 42, the size of the hinge 42, and the like. After the dewatered solids provide a force exceeding the applied first maximum equilibrium force on the lateral side 51, the spring hinge 42 may start to bend the top portion 40 and the dam assembly 36 from the non-extended configuration to the extended configuration.

In some embodiments, when the dam assembly 36 is in the extended configuration, the spring hinge assembly 42 may be configured such that a second equilibrium force point allows the spring hinge 42 to maintain the dam assembly 42 in the extended configuration up to the second equilibrium force point associated with an applied second minimum equilibrium force. The applied second minimum equilibrium force is the minimum threshold force needed to be applied to the lateral side 51 of the top portion 40 to retain the top portion 40 in the extended configuration and right before moving the dam 36 from the extended configuration back to the non-extended configuration and can be supplied by any dewatered solids 68 remaining on or near the lateral side 51. Any force (i.e., resultant force, distributed forces), such as provided by dewatered solids, more than this applied second minimum equilibrium force allows the dam assembly 36 to remain in the extended configuration, which may allow for the continued discharge of dewatered solids 68 over top of the top portion 40 before the top portion 40 swings back in toward decks 10 to the non-extended configuration. After the remaining dewatered solids provide a force less than the applied second minimum equilibrium force on the lateral side 51, the spring hinge 42 may start to bend the top portion 40 and the dam assembly 36 from the extended configuration to the non-extended configuration. In some embodiments, the vibration facilitator 34 may continue to operate to move solids 68 and 70 out over the top side 45 of the top portion 40 in the extended configuration.

In some embodiments, the first equilibrium force point (for extension of top portion 40) may be greater than the second equilibrium force point (for retraction of top portion 40) such that a greater force is needed to be applied on the first lateral side 51 of the top portion 40 of the dam assembly 36 to move the dam assembly 36 from the non-extended configuration to the extended configuration than the threshold force needed on the lateral side 51 of the top portion of the dam assembly 36 to keep the dam assembly 36 in the extended configuration before retracting the dam assembly 36 from the extended configuration to the non-extended configuration. This may result in the dam assembly 36 remaining open in the extended configuration to allow for sufficient discharge of solids 68 before closing and returning to the non-extended configuration. That is, the top portion 40 may stay extended even though the amount of solids that initially forced the top portion 40 open may be decreasing due to the discharge of the solids, such as shown in FIGS. 4*a* and 4*b*.

In some embodiments, the hinge assembly 42 may be adjustable such that in a first tightened state, the applied force needed to move the dam assembly 36 from the non-extended configuration to the extended configuration is increased. In a first loosened state for the hinge assembly 42, the applied force needed to move the dam assembly 36 from the non-extended configuration to the extended configuration is decreased. In some embodiments, the hinge assembly 42 may be adjustable such that in another tightened state, the applied minimum threshold force needed to retain the dam assembly 36 in the extended configuration may be increased. In another loosened state for the hinge assembly 42, the applied force needed to retain the dam assembly 36 in the extended configuration may be decreased. Any combinations of these states may result.

In some embodiments, friction or other mechanical means between side walls 18 and the ends of the top portion 40 may increase the amount of force needed to push the top portion 40 from the non-extended configuration to the extended configuration.

As shown in FIGS. 5*a* and 5*b*, in some embodiments, shaker assembly 8 may include an extendable support assembly 56 that may connect to the first elongated bar portion 110 of crank assembly 50 (FIG. 1) at upper attachment point 62. Extendable support assembly 56 may also connect to the top portion 40 of the dam 36 at lower attachment point 66. For example, extendable support assembly 56 may be an elastic cord, such as a bungee cord, and may attach to at the upper attachment point 62 by a hook assembly 114 hooked around the first elongated bar portion 110 and may attach at the lower attachment point 66 via a hook assembly 116 through an aperture or hole 66. In some other embodiments, extendable support assembly 56 may be attached via other means, such as bolts, screws, adhesive, and the like.

The tension on the dam 36 can be increased by adding, for example, the bungee cord (extendable support assembly 56) which will increase the amount of weight or force required for the dam 36 to release the material, such as to hold the material longer in order to achieve drier material, than would be needed without the bungee cord (extendable support assembly 56). In some embodiments, more than one cord (extendable support assembly 56) may be used depending on the desired tension of the dam 36. That is, the number of and/or strength of the bungee cords (extendable support assembly 56) can determine how much weight the dam 36 can withstand (e.g., threshold force, equilibrium force, discussed above) before the top portion 40 extends outward from forward shaker deck 10.

After a threshold amount of force (e.g., greater than a maximum equilibrium force) is exerted on the lateral side 51, the spring hinge 42 may start to bend the top portion 40 and the dam assembly 36 from the non-extended configuration to the extended configuration, extending the extendable support assembly 56 outward. In the extended configuration, after the remaining dewatered solids provide a force less than a threshold amount of force (e.g., less than a minimum equilibrium force) on the lateral side 51, the spring hinge 42 and extendable support assembly 56 may start to bend the top portion 40 and the dam assembly 36 from the extended configuration to the non-extended configuration.

In some embodiments, the extendable support assembly 56 may provide substantially all of the retaining lateral resistance force on the upper portion 40 of the dam assembly 36, such as when the hinge 42 does not provide substantially any retaining lateral resistance force. For example, the hinge 42 may be a butt hinge and the extendable support assembly 56 may provide substantially all of the retaining lateral resistance force used to hold solids in 10 until discharge (as discussed herein).

In some embodiments, the second bar portion 112 of crank assembly 50 may be held, cranked, and/or rotated to facilitate operation of the extendable support assembly 56 to retract or extend, or may provide extra strength to increase the amount of solids retained in the decks 10 before discharge. In embodiments where the extendable support assembly 56 may provide substantially all of the retaining lateral resistance force on the upper portion 40 of the dam assembly 36, the second bar portion 112 may be used to hold, extend, and/or retract the top portion 40 of the dam 36.

Figure 6:
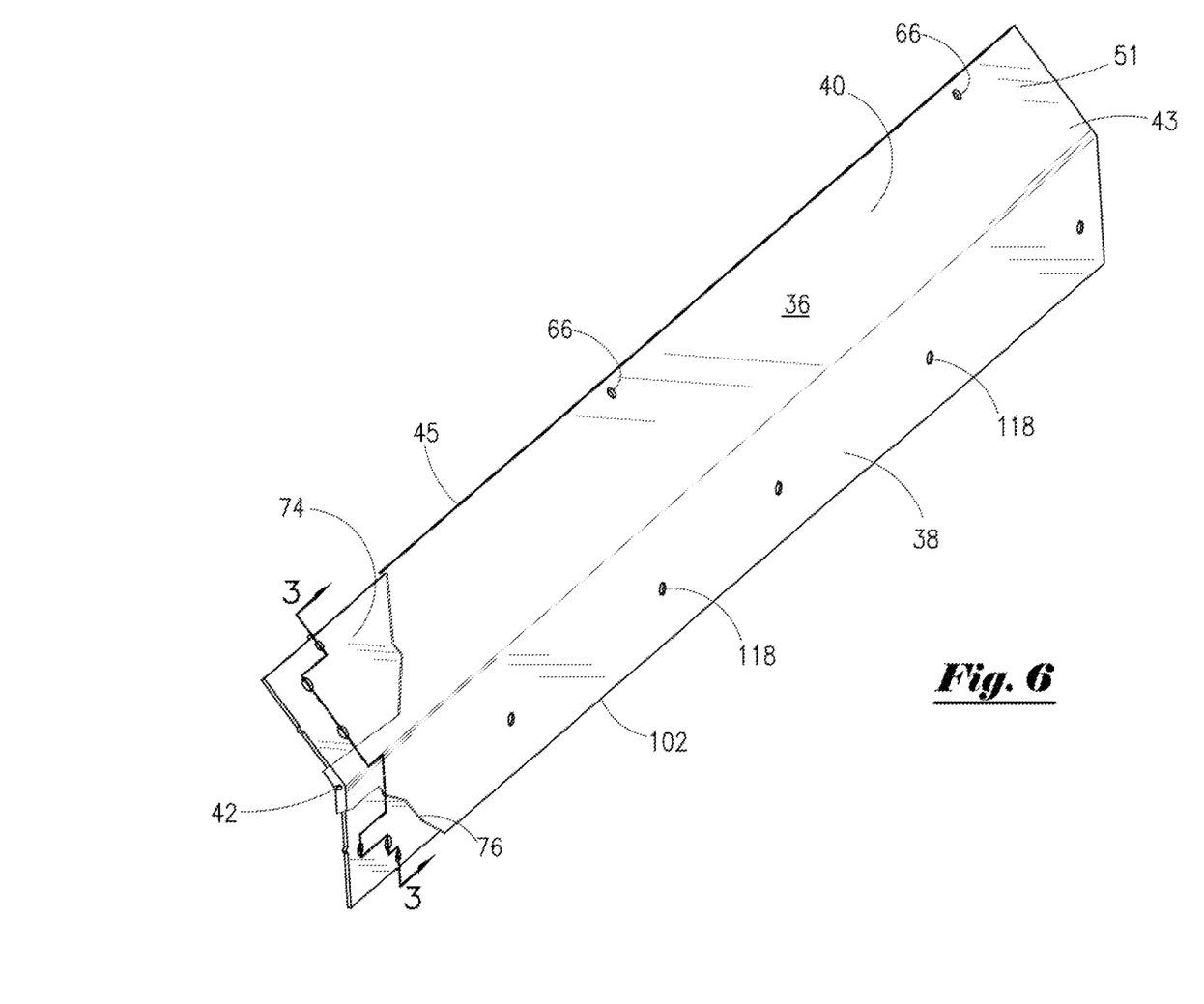
FIG. 6 is a perspective view of an embodiment of the dam assembly.

FIG. 6 illustrates the dam assembly 36 having an interior 74 and exterior 76. In some embodiments, the interior 74 can be made of metal, such as steel or aluminum. In some embodiments, the exterior can be a water proof material, such as polyurethane. The hinge 42 may be metal, such as steel or aluminum. The dam 36 may include one or more apertures 118 for connections to screws, bolts, or other fasteners. Dam assembly 36 may include cutouts 66, which may attach or hook to support assembly 56 (bungee).

According to features described herein, dimensions are approximate and may be scaled to size based on desired sizing and scaling.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A shaker for separating solids from a solid/liquid slurry comprising:
   a frame;
   a rectangular vibrating screen deck including a screen, a region above said screen being bounded by a wall on two long sides and on one of two short sides, said rectangular vibrating screen deck being supported by said frame and capable of separating at least a portion of liquid in said slurry from solids contained therein by allowing liquid to pass downwardly through said screen;
   a vibration facilitator vibrationally coupled to said rectangular vibrating screen deck; and
   a movable dam assembly positioned at the other short side including an upper wall movably connected to said frame by a hinge assembly, said upper wall, when in an upright position, together with said wall, completing a rectangular enclosure above said screen;

wherein lowering of said upper wall by movement about said hinge assembly, permits solids having a reduced liquid content to be discharged.

2. The shaker of claim 1, wherein said hinge assembly is spring biased.

3. The shaker of claim 1, wherein at least a portion of said hinge assembly is constructed from metal.

4. The shaker of claim 3, wherein said metal is steel or aluminum.

5. The shaker of claim 1, wherein said hinge assembly comprises an elongate portion of reduced thickness extending between and connecting said upper wall and a lower wall of said dam assembly, said upper wall being movable about said elongate portion of reduced thickness.

6. The shaker of claim 1, wherein a bungee extends in tension between an upper portion of said upper wall and an upright extending vertically from said frame.

\* \* \* \* \*